(No Model.)
H. G. ROBINSON.
RELIEF VALVE FOR STEAM ENGINES.
No. 310,912. Patented Jan. 20, 1885.
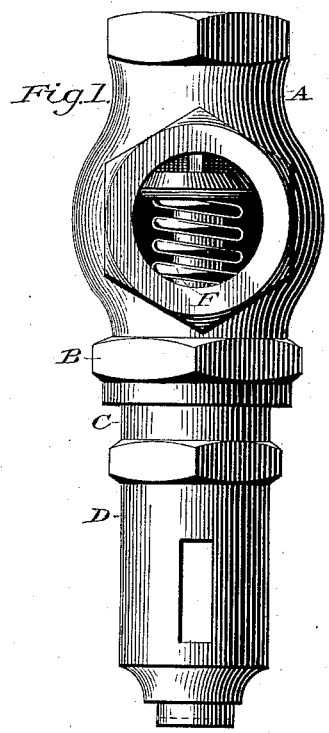
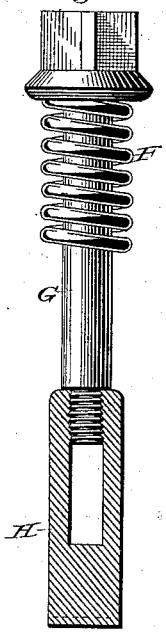
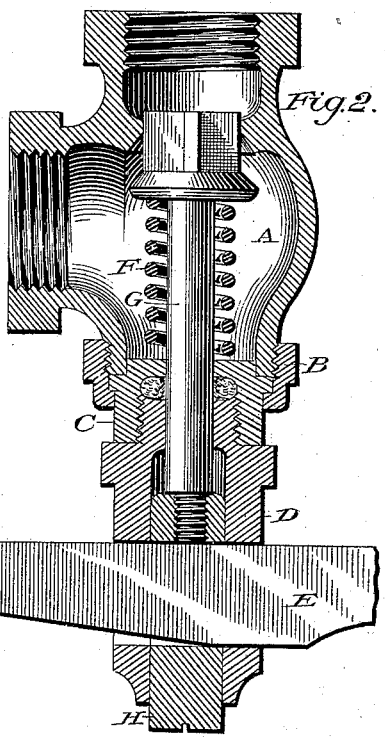
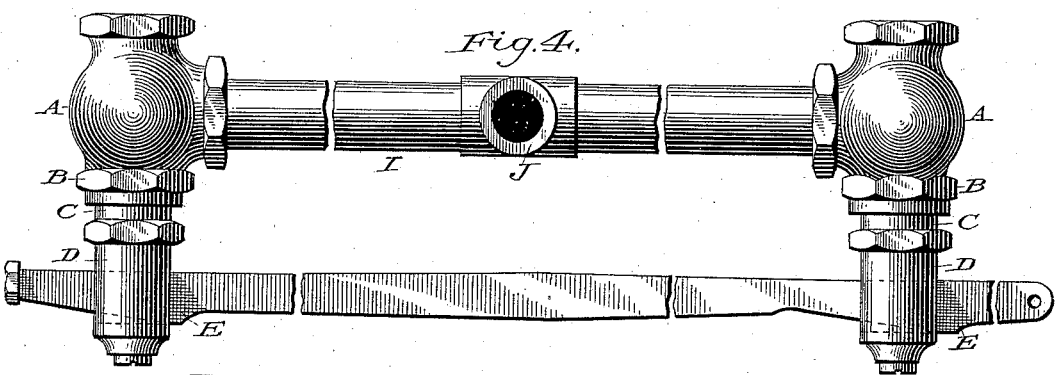
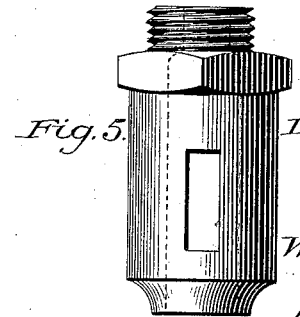
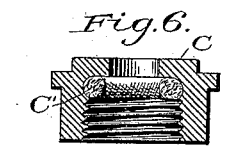
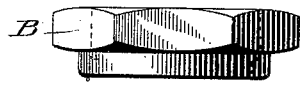
Witnesses:
R. J. Christy
Louis Buyer
Inventor.
Hale G. Robinson

United States Patent Office.

HALE G. ROBINSON, OF SANDUSKY, OHIO.

RELIEF-VALVE FOR STEAM-ENGINES.

SPECIFICATION forming part of Letters Patent No. 310,912, dated January 20, 1885.

Application filed June 18, 1884. (No model.)

*To all whom it may concern:*

Be it known that I, HALE G. ROBINSON, a citizen of the United States, residing at Sandusky, in the county of Erie and State of Ohio, have invented a new and useful Relief-Valve for Steam-Engines, of which the following is a specification.

My invention relates to improvements in relief-valves for steam-engines in which the valve is arranged to work automatically, as well as to be operated by hand; and the objects of my improvements are, first, to provide a simple and effective means of relieving the cylinder of a steam-engine of accumulated water and excessive steam-pressure, and to prevent the breakage of parts; second, to simplify and cheapen the construction of the cooperating parts of relief-valves; and, third, to provide a simple and ready mechanism for opening and closing a pair of such relief-valves at the same instant. I attain these several objects by the mechanism illustrated in the accompanying drawings, forming a part of this specification, in which—

Figure 1 is a front view of my improved relief-valve without the opening-wedge. Fig. 2 is a side view of the same, showing the opening-wedge in use. Fig. 3 is a view of the valve-stem and plunger. Fig. 4 is a view of a pair of my relief-valves and the double opening-wedge in use. Fig. 5 is a view of the plunger-casing. Fig. 6 is a sectional view of my improved stuffing-box, and Fig. 7 is a view of the nut connecting the several parts.

Similar letters refer to similar parts throughout the several views.

Letter A represents an ordinary steam-pipe bowl with three branch openings, the upper one to be connected with one end of a steam-engine cylinder, the lower one connected with my improved stuffing-box and plunger-casing, and the one in the side to be connected with the escape-pipe or other discharge-opening.

Letter B represents a nut provided with a flange or collar for connecting the stuffing-box and plunger-casing to the pipe-bowl A.

Letter C represents my improved stuffing-box, which is to be constructed as shown, and fitted and dropped into the top of the flanged nut B before making the connection with the plunger-casing. The recess C' inside of the stuffing-box C is to be filled with ordinary cotton packing, which may be inserted before the parts are connected, or it may afterward be supplied, as hereinafter explained.

Letter D represents the plunger-casing forming the lower part of my improved valve. The upper end of this casing is threaded, as shown in Fig. 5, and is to be screwed into the lower part of stuffing-box C, after the latter has been first dropped into and partly through flanged nut B, as hereinbefore described. The lower part of the casing D is bored out smoothly for the plunger H to work in closely. The casing D and the plunger H are both provided with a slot, as shown in Figs. 1 and 3, the one in the plunger being made somewhat longer than the one in the casing, and through these slots the opening-wedge E is inserted, as shown in Figs. 2 and 4.

Letter G represents the valve-stem, the upper end being formed into an ordinary valve head or stopper, and the lower end being threaded to be screwed into the upper end of the plunger H, as shown in Fig. 3.

Letter F represents a coil-spring, which is to be slipped onto the valve-stem G before connecting the same with the plunger, as shown in Fig. 3. This coil-spring may be made of any suitable material, and is to have its tension so regulated that the valve will open when an excess of pressure occurs in the cylinder of the engine, and thus automatically operate the longer slot in the valve-plunger, allowing it to so operate by sliding down and up on the opening-wedge, the excess of pressure in the steam-cylinder opening the valve and the coil-spring closing it. In the lower end of plunger H a notch is cut, as shown, in which to insert a screw-driver, and when it is necessary to pack or repack the stuffing-box the opening-wedge is removed and the plunger unscrewed from stem G and taken out of the plunger-casing D, which may then also be unscrewed and taken off, when the packing can readily be inserted in the stuffing-box, and the valve and spring will remain in place and at work.

In Fig. 4, letter I represents a pipe connecting the exit-opening of my improved valves with the escape or other discharge pipe, (marked J,) the operation of which may be understood from the drawings.

In applying my improved valves to use I prefer to use one valve at each end of the steam-cylinder, and when opened by hand to operate both valves at the same instant. This I accomplish by means of a double wedge formed out of a single piece of iron or steel, one of the wedges at one end of the rod working one valve, and the other wedge at the other end of the rod working the other valve, and both being opened or closed by one movement of a hand-lever to be connected with the opening-wedge rod and located at the bed end of the engine in any suitable manner. These opening-wedges are also to be made with straight or level portions, for the purpose of holding open the valves when necessary, as shown in Figs. 2 and 4.

I do not, however, wish to be limited to the operation of my improved valve by means of the wedge-shaped device shown, as an eccentric or cam shaped device may be formed on or connected with a rod and used for opening and closing the valves in substantially the same manner without departing from the spirit of my invention. The construction of the valve-plunger H may also be modified somewhat without departing from the spirit of my invention. Thus, for instance, instead of having a notch cut in its lower end and being unscrewed with a screw-driver, as hereinbefore described, the end of the plunger could be made to project slightly through the casing D, and squared so as to be unscrewed with an ordinary wrench.

I am aware that prior to my invention relief-valves of various forms have been used, and therefore do not broadly claim such devices; but What I do claim, and desire to secure by Letters Patent, is—

1. In relief-valves for steam-engines, the combination of the pipe-bowl A, flanged nut B, stuffing-box C, slotted plunger-casing D, opening-wedge E, valve-stem G, and plunger H, all constructed and operating in the manner substantially as shown and described.

2. In relief-valves for steam engines, the combination of pipe-bowl A, flanged nut B, stuffing-box C, slotted plunger-casing D, opening-wedge E, coil-spring F, valve-stem G, and plunger H, all constructed and operating in the manner substantially as shown and described.

HALE G. ROBINSON.

Witnesses:
R. J. CHRISTY,
LOUIS BUYER.